United States Patent
Yang et al.

(10) Patent No.: US 9,864,849 B2
(45) Date of Patent: Jan. 9, 2018

(54) VIEW-BASED EXPIRATION OF SHARED CONTENT

(71) Applicant: Dropbox, Inc., San Francisco, CA (US)

(72) Inventors: Zeya Yang, San Francisco, CA (US); Nathaniel Herman, San Francisco, CA (US); Michael Anderson, San Francisco, CA (US); Tsahi Glik, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 67 days.

(21) Appl. No.: 14/983,168

(22) Filed: Dec. 29, 2015

(65) Prior Publication Data

US 2017/0185753 A1 Jun. 29, 2017

(51) Int. Cl.
G06F 21/00 (2013.01)
G06F 21/10 (2013.01)
H04L 29/06 (2006.01)

(52) U.S. Cl.
CPC ............ G06F 21/10 (2013.01); H04L 63/102 (2013.01)

(58) Field of Classification Search
CPC ....... H04L 63/102; H04L 63/08; H04L 41/22; G06F 21/10; G06F 21/6227
USPC .......................................................... 726/28
See application file for complete search history.

(56) References Cited

U.S. PATENT DOCUMENTS

| 8,732,853 B1* | 5/2014 | Byrne ................. H04L 63/0838 713/183 |
| 8,925,108 B2 | 12/2014 | Herbach et al. |
| 2007/0171462 A1* | 7/2007 | Shoya .................... G06Q 10/10 358/1.15 |
| 2009/0083317 A1* | 3/2009 | Yoshihara ......... G06F 17/30165 |

OTHER PUBLICATIONS

Locklizard, "Lizard Safeguard's PDF Protection", http://www.locklizard.com/pdf_security_features.htm, dated Dec. 2, 2015, 10 pages.
CloudFuze, "How to Share Files with a Download Count Limit", https://www.cloudfuze.com/share-files-download-count-limit/, dated Dec. 2, 2015, 3 pages.

(Continued)

*Primary Examiner* — Syed Zaidi
(74) *Attorney, Agent, or Firm* — Hickman Palermo Becker Bingham LLP; C. James Oh

(57) ABSTRACT

Techniques related to view-based expiration of shared content are described. An online content management system receives a view access request from a client device. The view access request includes a shared link to a server-stored content item. A view access counter associated with the shared link is used to determine that the view access request is authorized. The shared link is resolved to the server-stored content item, and at least a portion of the server-stored content item is sent to the client device. Optionally, instructions that cause the client device to send an acknowledgement can also be sent to the client device. The acknowledgement indicates that one or more presentation conditions have been satisfied. The one or more presentation conditions can include presenting at least the portion of the server- (Continued)

stored content item at the client device. The online content management system receives the acknowledgement and increments the view access counter.

20 Claims, 12 Drawing Sheets

(56) References Cited

OTHER PUBLICATIONS

Box, "Secure File Sharing w/ Box Powerful, Simple, Fast" Share Securely with Box, https://www.box.com/business/secure-file-sharing/, dated Dec. 2, 2015, 5 pages.

* cited by examiner

FIGURE 6

MAPPING 600 →

| LINKS 602 | VIEW ACCESS COUNTERS 604 | MAXIMUM NUMBER OF AUTHORIZED VIEW ACCESSES 606 |
|---|---|---|
| SHARED LINK 500 | 0 | 1 |
| SHARED LINK 608 | 3 | 5 |

VIEW-BASED EXPIRATION OF SHARED CONTENT

TECHNICAL FIELD

The present Application relates to content collaboration technology. More specifically, the example embodiment(s) of the present Application relate to view-based expiration of shared content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Content sharing typically relies on one medium for sharing content and another medium for communicating receipt of the shared content. For example, a sending entity can send a large file to a receiving entity via a particular web-based service, but the sending entity and the receiving entity may be unable to otherwise communicate via the particular web-based service. Thus, the receiving entity may have to acknowledge receipt via a different web-based service. As a result, both the sending entity and the receiving entity may leave and neglect to return to the particular web-based service, thereby causing the particular web-based service to lose hard-won visitor traffic. Furthermore, communicating receipt of shared content often conveys little useful information. Such communications typically indicate nothing other than a successful transmission of the shared content.

BRIEF DESCRIPTION OF THE DRAWINGS

The example embodiment(s) of the present invention are illustrated, by way of example and not limitation, in the accompanying drawings in which like reference numerals refer to similar elements and in which:

FIG. 6 depicts an example mapping between links and view access counters.

DESCRIPTION OF THE EXAMPLE EMBODIMENT(S)

In the following description, for the purposes of explanation, numerous specific details are set forth in order to provide a thorough understanding of the example embodiment(s) the present Application. It will be apparent, however, that the example embodiment(s) can be practiced without these specific details. In other instances, well-known structures and devices are shown in block diagram form in order to avoid unnecessarily obscuring the example embodiment(s).

General Overview

According to some example embodiments, an online content management system stores content and associates the content with a link to the content that can be distributed to one or more users. When the online content management system receives a request to access the content via the link from a client device, the online content management system determines whether the client device can access the content via the link. This determination is based on looking up an access counter that is associated with the link. More specifically, the online content management system compares a value of the access counter to a maximum number of authorized accesses.

If the online content management system determines that the client device can access the content via the link, the online content management system resolves the link to the content and sends at least a portion of the content to the client device. Optionally, the online content management system can send, with the portion of the content, acknowledgement instructions for the client device to execute. The acknowledgement instructions cause the client device to send an acknowledgement to the online content management system when one or more presentation conditions related to the content have been satisfied at the client device. The one or more presentation conditions can include presenting, not simply receiving, at least the portion of the content at the client device. This presentation can occur in the foreground or the background. When the online content management system receives the acknowledgement, the access counter is incremented.

System Environment

Figure 1:
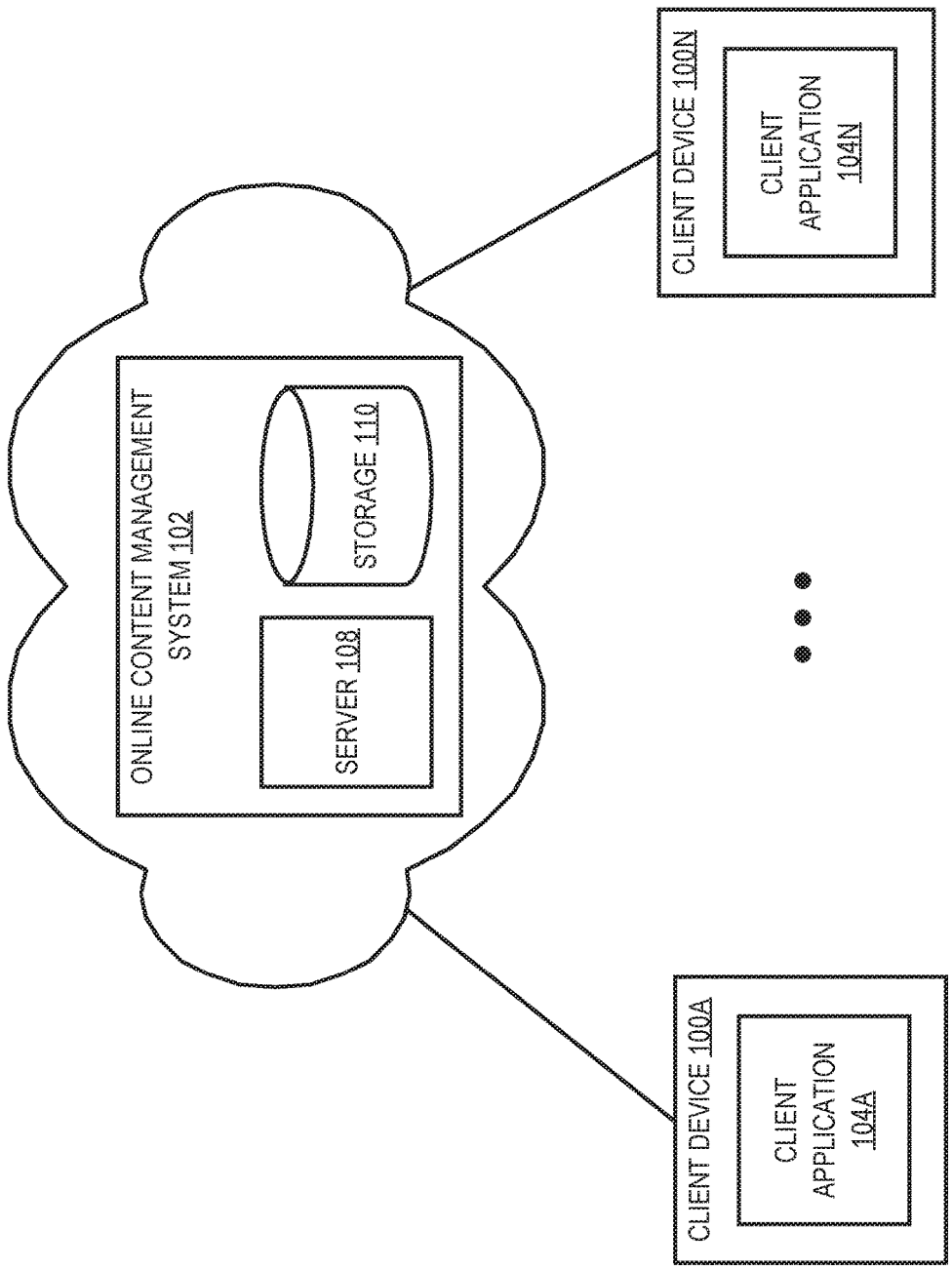
FIG. 1 depicts an example computer architecture upon which embodiments can be implemented.

FIG. 1 depicts an example computer architecture upon which embodiments can be implemented. Referring to FIG. 1, each of client devices 100A-N is communicatively coupled to online content management system 102, which includes server 108 and storage 110. Each of client devices 100A-N includes one of client applications 104A-N.

A "computer" can be one or more physical computers, virtual computers, and/or computing devices. For example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer can be a client and/or a server. Any reference to "a computer" herein can mean one or more computers, unless expressly stated otherwise.

Each of client devices 100A-N is a computer that acts as a client with respect to online content management system 102. Furthermore, each of client devices 100A-N is authorized to access one or more user accounts. Each user account of the one or more user accounts is associated with online content management system 102. Still further, each of client devices 100A-N provides an environment in which one or more client applications 104A-N executes.

Each of client applications 104A-N is a sequence of instructions executing at one of client devices 100A-N. For example, client application 104A can be a browser-based program or a native mobile app. Furthermore, each of client applications 104A-N can include instructions for communicating with online content management system 102 and/or synchronizing content stored at online content management system 102 with content stored at one of client devices 100A-N. For example, client application 104A can include instructions for synchronizing content stored in local storage (e.g., volatile memory, non-volatile memory) at client device 100A with content that is associated with a particular user account at online content management system 102. Additionally or alternatively, each of client applications 104A-N can include client-side script (e.g., JavaScript) for presenting (e.g., displaying in the foreground, displaying in the background) content.

Online content management system 102 includes one or more computers, such as a web server, a mobile server, a content sharing server, a storage computer, and/or a load-balancing computer. Online content management system 102 can manage content and/or user accounts. In the example of FIG. 1, online content management system 102 includes server 108 and storage 110. In some example embodiments, server 108 is communicatively coupled to storage 110. In some example embodiments, storage 110 is a component of server 108.

Server 108 is a computer that acts as a server with respect to one or more client devices 100A-N. Furthermore, server 108 can facilitate content sharing between/among client devices 100A-N. For example, server 108 can associate content with user accounts, create links to content, distribute links, determine whether a particular client device is authorized to access a particular user account, etc.

According to one embodiment of the present invention, server 108 can be commanded by a client device to generate a shareable link to server-stored content. For example, a user of a client device (e.g., 100A) can invoke an option presented in a graphical user interface (e.g., a web browser window or in a mobile application user interface) at the client device. The option can be for generating a shareable link to particular server-stored content under management of the online content management service. For example, the particular server-stored content can be associated with a user account held with the online content management service to which the user has access.

Once generated, the server 108 returns the generated link to the client device and/or provides the link to one or more designated link recipients. For example, the server 108 can provide the generated link to one or more link recipient(s) designated by the user when invoking the link generation option at the client device. The server 108 can provide the generated link to designated link recipients via any one or more of a number of different link providing mechanisms. For example, the server 108 can provide a generated link to a link recipient in an e-mail message, in a text message, as a push notification, etc.

If the server 108 returns the generated link to the client device, the user of the client device can provide the generated link to one or more link recipients. For example, the user can copy and paste the generated link into an e-mail message that the user sends to a link recipient.

In some example embodiments, the server 108 can return the generated link to the client device and/or the one or more designated link recipients any of a number of times in any combination. Thus, the server 108 can return the generated link to the client device and the one or more designated link recipients at the same time, at different times, and even multiple times. For example, the server 108 can send the generated link directly to the one or more designated link recipients. At a later time, the client device can communicate with online content management system 102 to access the generated link, which can be stored in a user account associated with online content management system 102, and send a copy of the generated link via another communication channel (e.g., an email client) at the client device. Thereafter, online content management system 102 can be requested to send the generated link directly to one or more additional recipients. This can be repeated any number of times until the generated link is disabled.

According to some embodiments of the present invention, a generated shareable link takes the form of a Uniform Resource Locator (URL) to the online content management service. In this case, the shareable link can comprise a content identifying portion that identifies the particular server-stored content to which the shareable link refers. For example, in the following example shareable link URL, the content identifying portion is the encoded character sequence "6ozoeyabtk6ogod/Getting %20Started.pdf" which refers to server-stored content named "Getting Started.pdf" associated with a particular user's account held with the "DROPBOX" online content management service.

https://www.dropbox.com/s/6ozoeyabtk6ogod/Getting %20Started.pdf

A shareable link can be submitted to the online content management service from a client device (e.g., client device 100B) by an authorized link submitter. Submitting a shareable link causes the online content management service to serve at least a portion of the referenced server-stored content for presentation at the client device from which the link is submitted. For example, the referenced content (or a portion thereof) can be presented in a graphical user interface at the client device, or the referenced server-stored content can be downloaded to the client device.

Storage 110 stores content that can be shared between/among client devices 100A-N. For example, storage 110 can be a database, a configuration file, and/or any other system and/or data structure that stores data. Storage 110 can include volatile and/or non-volatile memory.

Shared Content

Figure 2:
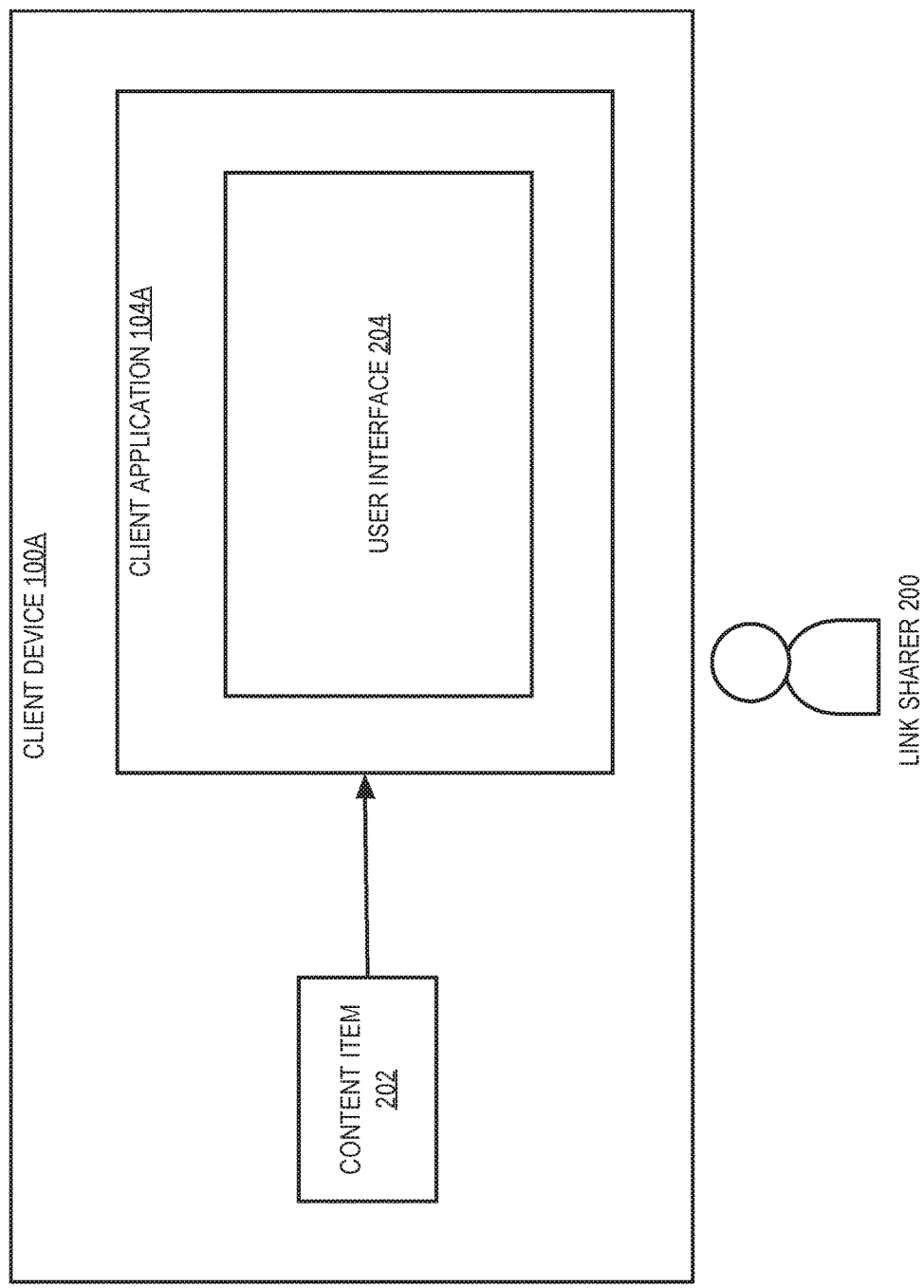
FIG. 2 depicts an example client device.

FIG. 2 depicts an example client device. Referring to FIG. 2, client device 100A is associated with link sharer 200. Client device 100A includes client application 104A, which includes user interface 204. Content item 202 is synchronized with data stored at online content management system 102. Synchronization can be automatic and/or via a user interface 204, such as a web browser interface, a page of a native mobile app, etc.

Content item 202 can be a document, a file, a folder, an image, a video, and/or any other data that can be presented in a user interface 204. For example, content item 202 can be one or more confidential documents that can be displayed in a Portable Document Format (PDF).

Referring to FIG. 2, content item 202 is obtained and/or stored at client device 100A outside of client application 104A. For example, content item 202 can be a document that is received, at client device 100A, in an email attachment that is opened at client device 100A. As another example, content item 202 can be a file that is generated at client device 100A and persisted to hard disk. Thus, sharing content item 202 can involve synchronizing content item 202 stored at client device 100A with data stored at online content management system 102. For example, user interface 204 can be used to persist content item 204 to storage 110 of online content management system 102 and/or associate content item 204 to a user account of link sharer 200.

Link sharer 200 is a user who shares content with a recipient based on causing a link to the content to be provided to the recipient. It is unnecessary for the recipient to register a user account with online content management system 102 in order to access (e.g., simply receive data) or view access (e.g., have data displayed in a user interface 204) the content. Link sharer 200 can send, via client device 100A, a request for online content management system 102 to create a link to the content. Online content management system 102 can generate and/or send the link to one or more recipients who were specified by link sharer 200 in the request. Additionally or alternatively, online content management system 102 can generate and/or send the link to link sharer 200, who can distribute the link to one or more recipients via email, Short Message Service (SMS), and/or any other communication channel. Thus, link sharer 200 can share and/or re-share content any number of times until the link is disabled.

Shared Links

Figure 3:
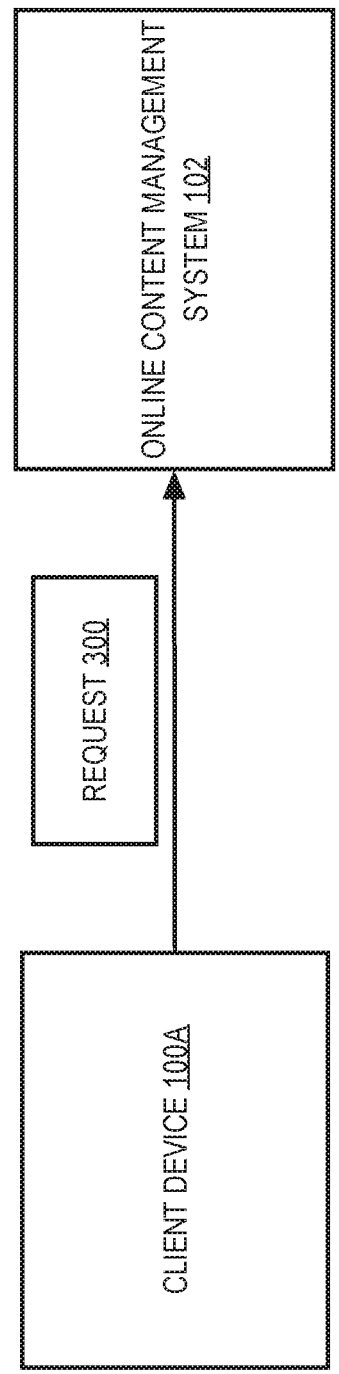
FIG. 3 depicts an example request to create a shared link.

FIG. 3 depicts an example of processing a request to create a shared link within an online content management system environment. Referring to FIG. 3, online content management system 102 receives request 300 from client device 100A.

In the example of FIG. 3, request 300 is a request from link sharer 200 for online content management system 102 to create one or more links to content item 202. In response, online content management system 102 can generate and associate the one or more links with content item 202 which is stored at online content management system 102 (e.g., in storage 110) and/or is accessible via the user account of the link sharer 200. In this manner, content item 202 is associated with and is accessible via the one or more links. Online content management system 102 and/or link sharer 200 can distribute the one or more links to one or more recipients. Each recipient of the one or more recipients can be identified based on an email address, an Internet Protocol (IP) address, a media access control (MAC) address, and/or any other user pseudonym. Furthermore, link sharer 200 can specify one or more options that are related to sharing content item 202. For example, user interface 204 can include a link settings screen that link sharer 200 can use to specify that the one or more options include any of a number of different options including the following:
  providing link sharer 200 with a notification each time at least a portion of content item 202 is accessed by any recipient and/or a particular recipient of a shared link;
  providing link sharer 200 with a notification the first time at least a portion of content item 202 is accessed by any recipient and/or a particular recipient of a shared link;
  providing link sharer 200 with an aggregated notification that indicates each time at least a portion of content item 202 has been accessed by any recipient and/or a particular recipient of a shared link;
  providing link sharer 200 with a notification each time at least a portion of content item 202 is view accessed (e.g., presented for a predetermined length of time, interacted with in a particular manner) by any recipient and/or a particular recipient of a shared link;
  providing link sharer 200 with a notification the first time at least a portion of content item 202 is view accessed by any recipient and/or a particular recipient of a shared link;
  providing link sharer 200 with an aggregated notification that indicates each time at least a portion of content item 202 has been view accessed by any recipient and/or a particular recipient of a shared link;
  limiting a number of times that at least a portion of content item 202 can be accessed by any recipient and/or a particular recipient of a shared link;
  limiting a number of times that at least a portion of content item 202 can be view accessed by any recipient and/or a particular recipient of a shared link.

Thus, the link settings screen can be used to specify one or more authorized recipients, one or more access/view access receipts, and/or a maximum number of accesses/view accesses for a particular link. Each of the one or more options can be specified independently or in conjunction with any other option. For example, each recipient of a particular link can be associated with a different maximum number of accesses/view accesses. As another example, notification options can be specified without limiting the number of accesses/view accesses and vice versa.

View Access Counters

Figure 4:
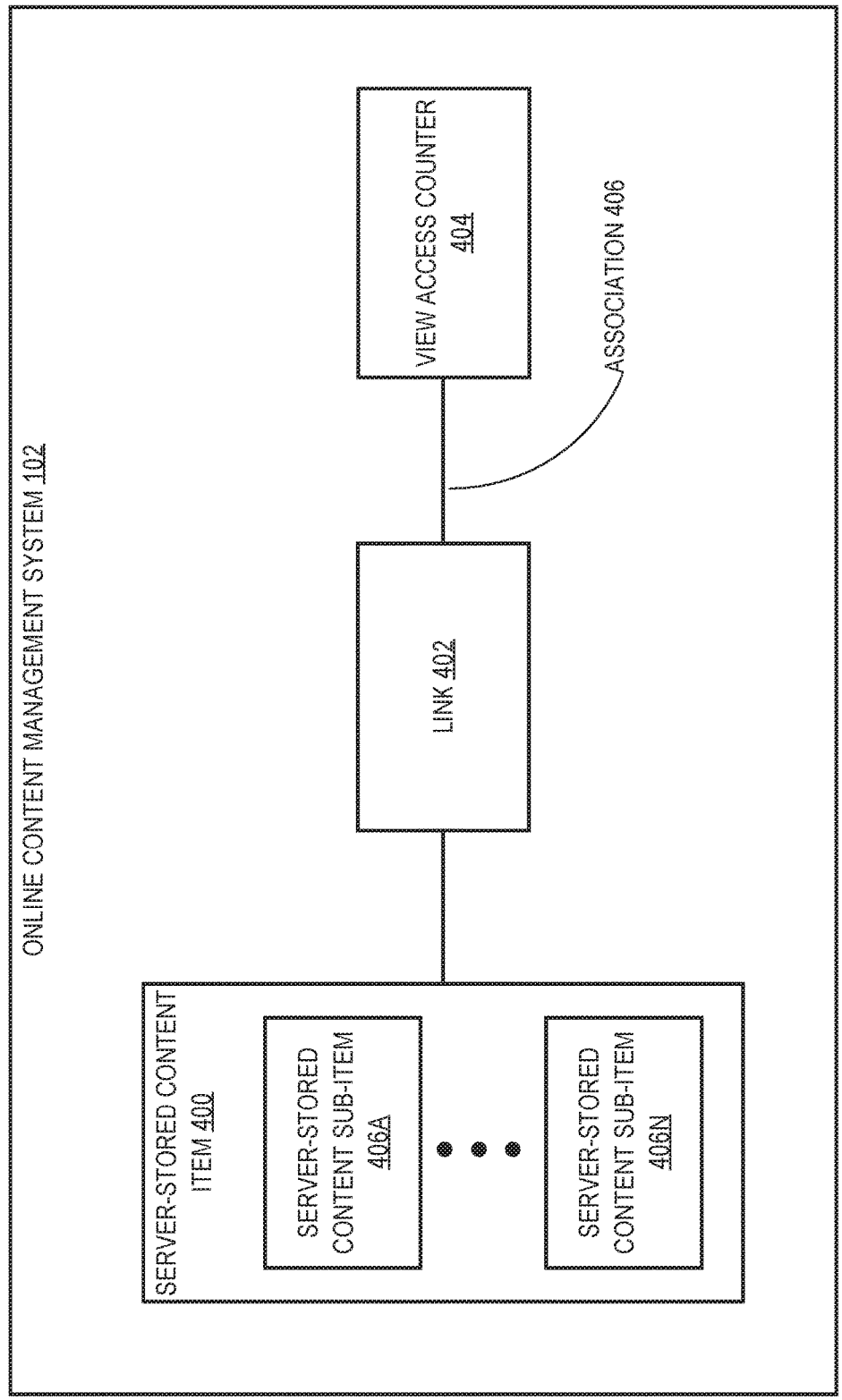
FIG. 4 depicts an example online content management system.

FIG. 4 depicts an example online content management system. Referring to FIG. 4, online content management system 102 includes server-stored content item 400, link 402, view access counter 404, and association 406. Server-stored content item 400 includes server-stored content sub-items 406A-N.

In response to receiving request 300, online content management system 102 creates the one or more links to content item 202. In some example embodiments, a single link can be generated for the one or more recipients who were specified by link sharer 200. Alternatively, a different link can be generated for each recipient of the one or more recipients who were specified by link sharer 200. In some example embodiments, a recipients-to-links mapping can be used to map one or more links to one or more recipients.

Furthermore, online content management system 102 can associate the one or more links with the one or more options specified by link sharer 200. For example, the one or more links can be associated with one or more view access counters that limit presentation of content item 202 to a predetermined number of times. In some example embodiments, a links-to-options mapping can be used to map a link 402 to one or more options.

In some example embodiments, each link can be agnostic of particular recipients. For example, a maximum number of accesses/view accesses can be set based on associating an access/view access counter with a single link for a particular content item. Thus, online content management system 102 is unconcerned with recipient identities; rather, it is concerned with limiting a total number of accesses/view accesses. For example, in the case of view accesses, online content management system 102 is concerned with incrementing a view access counter 404 whenever a view access event is detected. Example of view access events include presenting all or part of content item 202 for a specified duration, navigating (e.g., scrolling) through all or part of a document, viewing some or all content items in a folder, etc.

In some example embodiments, each link can be associated with one or more recipients. For example, a maximum number of accesses/view accesses can be set for each recipient based on associating a recipient identifier with an access/view access counter. In some example embodiments, a single link can be associated with multiple recipients based on a respective (recipient identifier, access/view access counter) pair that is associated with each recipient. In some example embodiments, each link can be associated with a different recipient, and each link can be associated with an access/a view access counter. Here, a recipient identifier can optionally add extra security.

In the example of FIG. 4, online content management system 102 creates link 402 to server-stored content item 400. Link 402 can be a hyperlink, a Uniform Resource Locator (URL), and/or any other indirect reference to server-stored content item 400. Server-stored content item 400 can be content item 202 stored in server 108 and/or storage 110. Online content management system 102 creates an association 406 between link 402 and access/view access counter 404. In some example embodiments, an access counter can be a variable that tracks a number of times link 402 is accessed, and view access counter 404 can be a variable that tracks a number of times server-stored content item 400 is presented. Association 406 can be stored as a mapping between links and access/view access counters. For example, association 406 can be a row in a database table with separate columns for links and access/view access counters. Online content management system 102 can associate an access counter or a view access counter 404 with each link that is generated.

In some example embodiments, server-stored content item 400 includes a plurality of server-stored content sub-items 406A-N. For example, server-stored content item 400 can correspond to a document, and the plurality of server-stored content sub-items 406A-N can correspond to pages of the document. To reference different portions of server-stored content item 400 with a finer level of granularity, each server-stored content sub-item of the plurality of server-stored content sub-items 406A-N can be associated with a different identifier. The different identifier can be used in conjunction with link 402 to uniquely identify a particular server-stored content sub-item. For example, server-stored content sub-item 406A can correspond to "object #1". If link 402 corresponds to "https://www.dropbox.com/aBc123", then server-stored content sub-item 406A can be referenced by the combination of "https://www.dropbox.com/aBc123" and "object #1". Thus, a hierarchy of links and sub-item identifiers can correspond to a hierarchy of content items and content sub-items. In some example embodiments, the link and sub-item combination can be represented as a separate link, such as "https://www.dropbox.com/aBc123/object=1".

In some example embodiments, online content management system 102 associates each server-stored content sub-item with a separate access/view access counter. For example, a separate view access counter can be associated with each sub-item identifier. This can be useful when server-stored content item 400 is a folder that contains multiple documents.

View Access Requests

Figure 5:
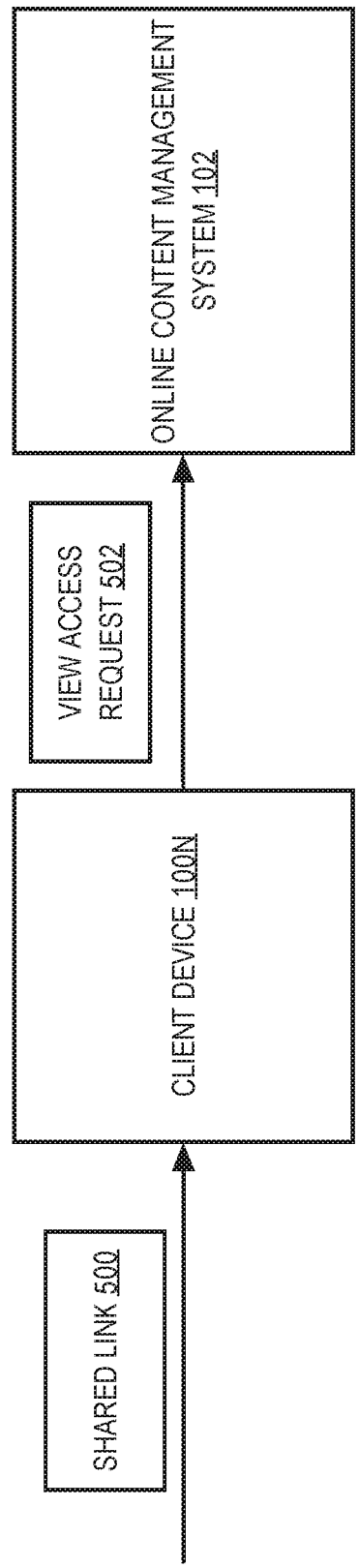
FIG. 5 depicts an example view access request.

FIG. 5 depicts an example view access request. Referring to FIG. 5, client device 100N obtains shared link 500 and sends view access request 502 to online content management system 102.

Shared link 500 can be a link 402 that is shared with a recipient specified by a link sharer 200. For example, shared link 500 can be included in an email that online content management system 102 generates and/or sends to the recipient. When the recipient uses client device 100N to interact with (e.g., click on) shared link 500, the client device 100N sends an access request or a view access request 502 to online content management system 102.

In some example embodiments, access/view access request 502 identifies shared link 500. For example, view access request 502 can include shared link 500. Online content management system 102 can then resolve shared link 500 to server-stored content item 400 based on a mapping between links and content items. Additionally or alternatively, access/view access request 502 can include a recipient identifier.

View Access Authorization

In response to receiving access/view access request 502, online content management system 102 determines whether access/view access request 502 is authorized based on identifying an access counter or a view access counter 404 that is associated with a particular shared link. This identification can be based on any of a number of mappings that include access/view access counters. FIG. 6 depicts an example mapping between links and view access counters. Referring to FIG. 6, mapping 600 includes columns for links 602, view access counters 604, and maximum number of authorized view accesses 606 (hereinafter "maximum 606"). The column for links 602 includes shared link 500 and shared link 608. Mapping 600 further includes rows for shared link 500 and shared link 608.

In the example of FIG. 6, mapping 600 maps links 602 to view access counters 604. For example, shared link 500 is mapped to a view access counter 404 that has a value of zero. The value of an access counter or a view access counter 404 can be modified based on an appropriate command, such as a Structured Query Language (SQL) database statement. Mapping 600 can map links 602 and/or access/view access counters 604 to other information, such as maximum 606 that was specified by link sharer 200 in the one or more options related to sharing content item 202. Thus, authorization of access/view access requests can be determined based on comparing values of access/view access counters 604 to values of maximum 606.

In some example embodiments, an authorization determination can be based on a recipients-to-access/view-access-counters mapping. In other words, mapping 600 can map access/view access counters 604 to recipient identifiers, such as email addresses or other user pseudonyms. Thus, access/view access counters 604 can be configured on a per-user basis.

View Access Acknowledgements

Figure 7:
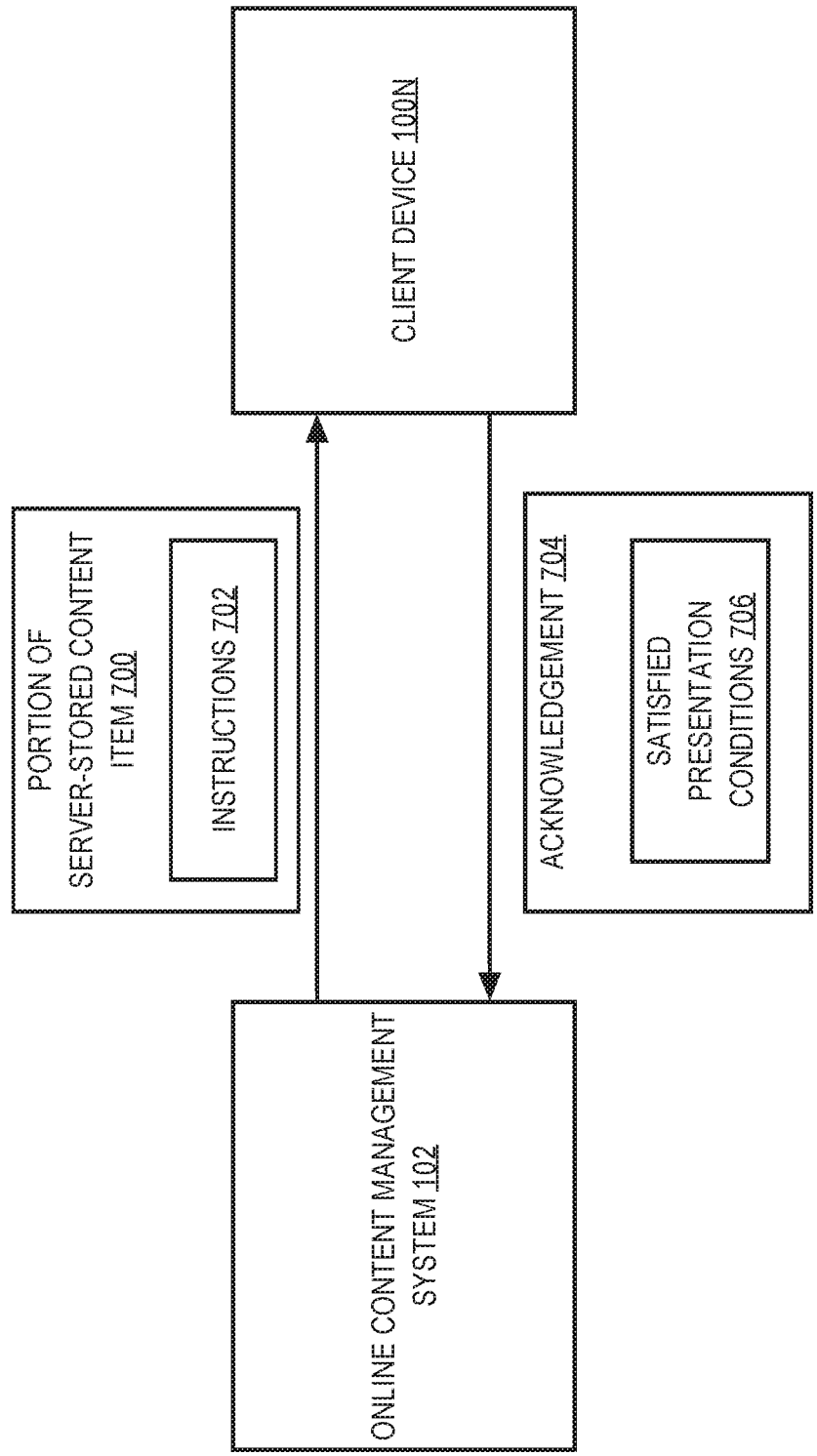
FIG. 7 depicts an example data exchange that follows view access authorization.

FIG. 7 depicts an example data exchange that follows access/view access authorization. Referring to FIG. 7, online content management system 102 sends portion of server-stored content item 700 along with instructions 702 to client device 100N. Client device 100N sends acknowledgement 704 indicating satisfied presentation conditions 706 to online content management system 102.

Online content management system 102 can send at least a portion of server-stored content item 700 (hereinafter "portion 700") to a client device 100N that is associated with an authorized access/view access request. In some example embodiments, server-stored content item 400 is divided into a number of portions prior to being transmitted. For example, the portions can correspond to server-stored content sub-items 406A-N, data packets, etc.

Online content management system 102 can also send instructions 702 to a client device 100N that is associated with an authorized access/view access request. Instructions 702 can be sent prior to, concurrently with, or subsequent to a transmission of portion 700. In the example of FIG. 7, portion 700 includes instructions 702.

Instructions 702 are executed at the client device 100N that is associated with the authorized access/view access request. When the client device 100N executes instructions 702, the client device 100N sends acknowledgement 704 to online content management system 102. Instructions 702 can be a callback function, a remote procedure call, or any other sequence of code that causes sending acknowledgement 704 to online content management system 102.

Acknowledgement 704 provides an indication that one or more presentation conditions with respect to server-stored content item 400 have been satisfied at the client device 100N. For example, at least one presentation condition of the one or more presentation conditions can be that at least portion 700 is presented at the client device 100N in a user interface 204.

When online content management system 102 receives acknowledgement 704 from the client device 100N, online content management system 102 increments access/view access counter 404 that is associated with shared link 500. For example, a database command can be used to modify mapping 600 such that view access counter 404 has a value of "1" instead of "0".

Figure 8:
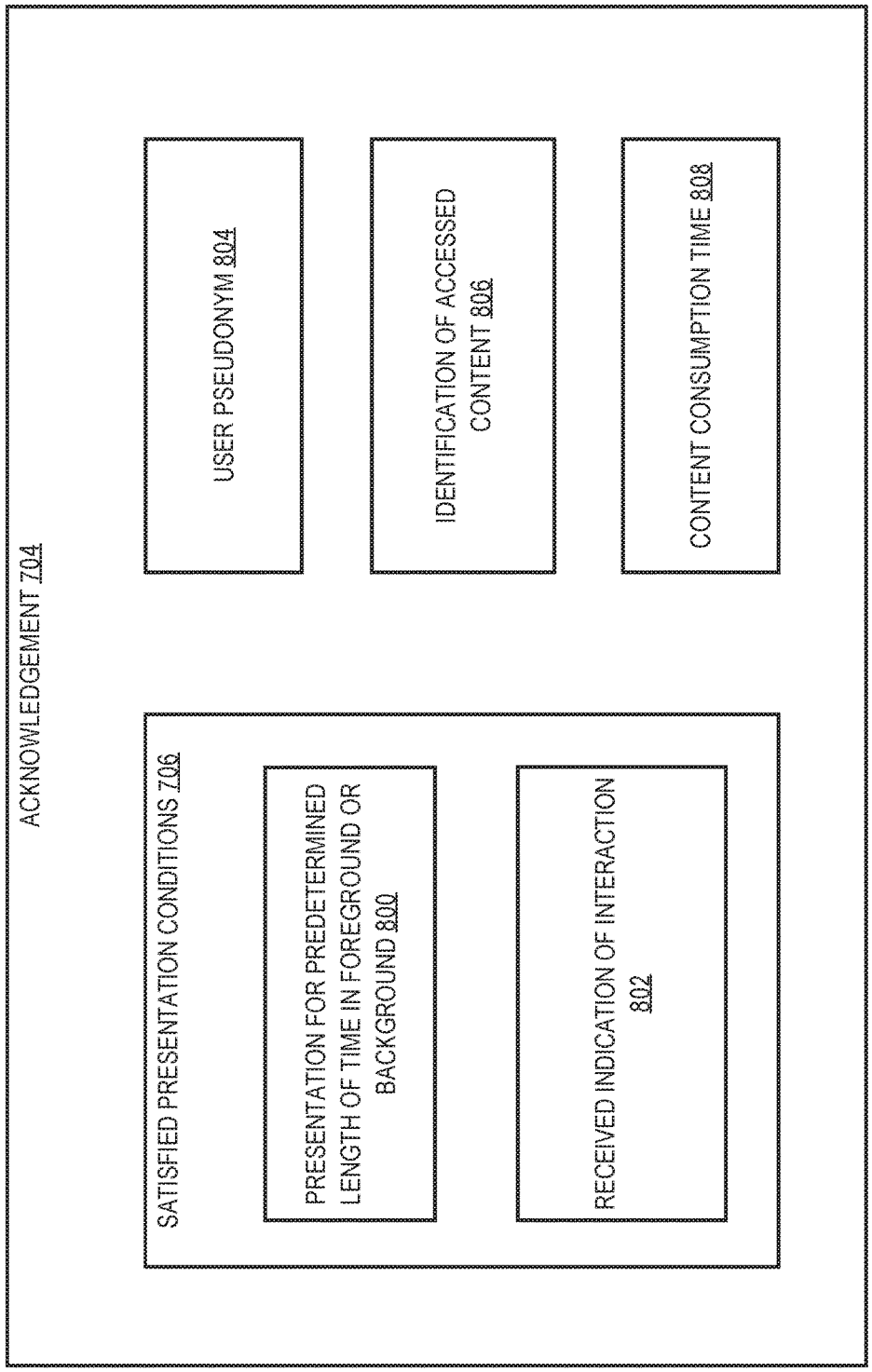
FIG. 8 depicts a detailed view of an example acknowledgement sent to an online content management system.

FIG. 8 depicts a detailed view of an example acknowledgement sent to an online content management system. Referring to FIG. 8, acknowledgement 704 includes satisfied presentation conditions 706, user pseudonym 804, identification of accessed content 806, and content consumption time 808. Satisfied presentation conditions 706 further include presentation for predetermined length of time in foreground or background 800 (hereinafter "presentation 800") and received indication of interaction 802.

As mentioned above, satisfied presentation conditions 706 can include presentation, not merely receipt, of at least portion 700 at the client device 100N. Information regarding satisfied presentation conditions 706 can be collected at the client device 100N based on client-side scripts. For example, acknowledgement 704 can indicate that at least portion 700 was fully loaded and/or displayed at the client device 100N. Significantly, this avoids prematurely incrementing view access counter 404.

Additionally or alternatively, satisfied presentation conditions 706 can include presentation 800. In other words, acknowledgement 704 can indicate that at least portion 700 was presented at the client device 100N for a predetermined length of time either in the foreground or the background. For example, an arbitrary length of time (e.g., ten seconds) can be used to ensure that a recipient has an adequate opportunity to consume server-stored content item 400. This arbitrary length of time can be computed regardless of whether server-stored content item 400 is being presented in an active or passive window.

Additionally or alternatively, satisfied presentation conditions 706 can include received indication of interaction 802. In other words, acknowledgement 704 can indicate that a recipient interacted with at least portion 700 at the client device 100N and that an indication of such an interaction was received at the client device 100N. For example, the interaction can include a scrolling action, a clicking action, and/or any other action related to navigating at least portion 700. In some example embodiments, the interaction can include confirmation that a recipient is finished consuming at least portion 700. The confirmation can be received in response to a user prompt that is presented at the client device 100N. The user prompt can be presented automatically when the end (e.g., signified by an end-of-file marker) of at least portion 700 has been reached.

In some example embodiments, acknowledgement 704 can include user pseudonym 804. In other words, acknowledgement 704 can identify a recipient who accessed/view accessed at least portion 700 at the client device 100N. For example, acknowledgement 704 can include the email address to which shared link 500 was sent.

In some example embodiments, acknowledgement 704 can include identification of accessed content 806. In other words, acknowledgement 704 can identify one or more portions of server-stored content item 400 that were accessed/view accessed at the client device 100N. For example, acknowledgement 704 can include shared link 500 and/or any identifiers that can be resolved to at least portion 700.

In some example embodiments, acknowledgement 704 can include content consumption time 808. In other words, acknowledgement 704 can indicate a length of time spent consuming at least portion 700 at the client device 100N. For example, acknowledgement 704 can include a length of time computed by a client-side script that marked the system time when display was initiated and when display was terminated.

Figure 9:
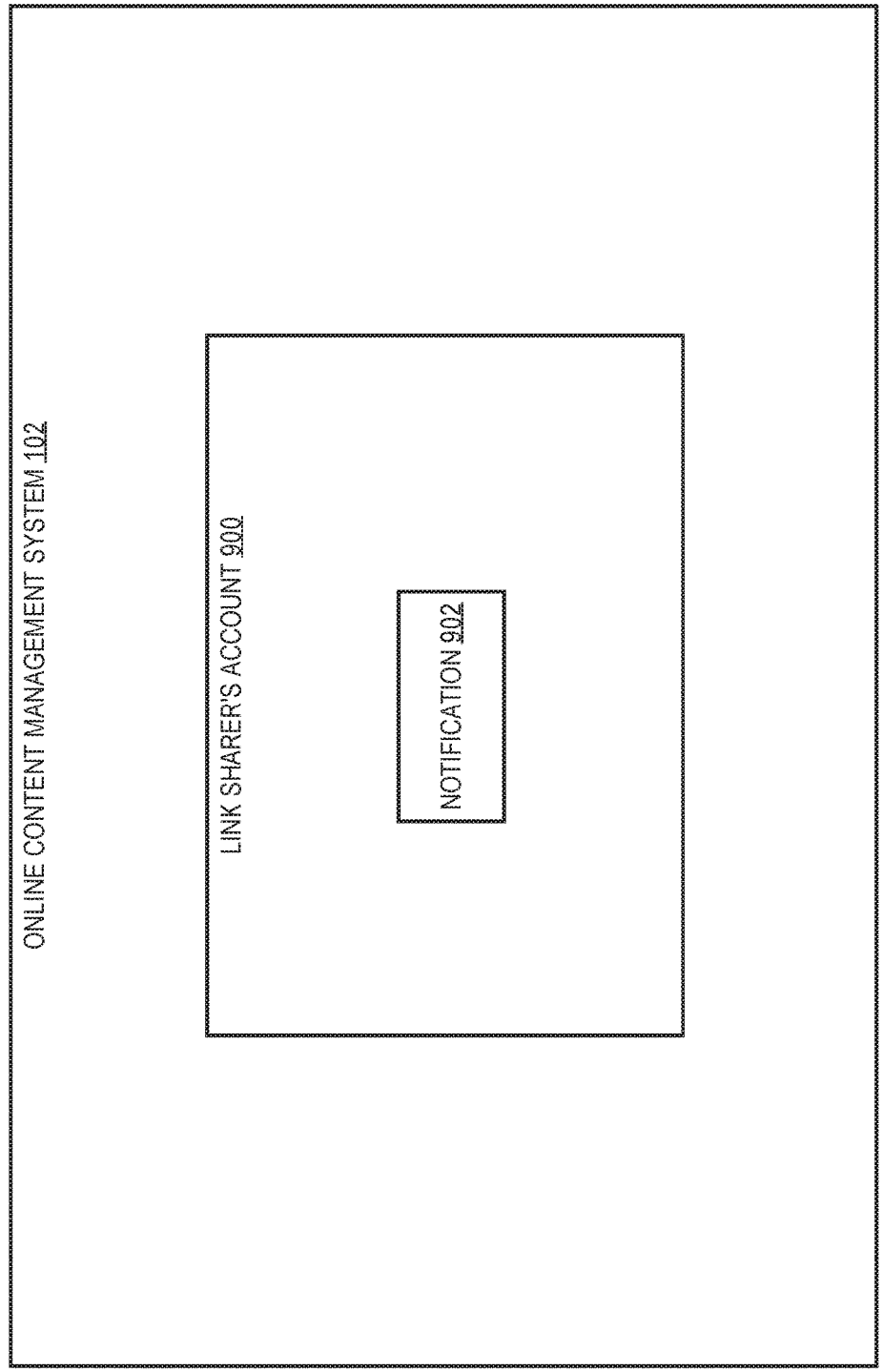
FIG. 9 depicts an example notification associated with a link sharer's account.

In response to receiving acknowledgement 704, online content management system 102 can increment access/view access counter 404 and associate a notification including at least a portion of acknowledgement 704 with a user account of link sharer 200. FIG. 9 depicts an example notification associated with a link sharer's account, which is a user account of link sharer 200. Referring to FIG. 9, online content management system 102 associates notification 902 with link sharer's account 900. Thereafter, notification 902 is accessible via link sharer's account 900. For example, if client device 100A is associated with link sharer's account 900, notification 902 can be forwarded to client device 100A. Additionally or alternatively, notification 902 can be presented to link sharer 200 based on accessing link sharer's account 900. In other words, notification 902 can be stored at online content management system 102 and can be accessed via link sharer's account 900.

As mentioned above, link sharer 200 can specify that the one or more options related to sharing content item 202 include providing link sharer 200 with confirmation (e.g., an access receipt, a view receipt) that content item 202 was accessed or presented at one or more client devices 100A-N. Thus, online content management system 102 can provide link sharer 200 with at least some information included in acknowledgement 704. For example, link sharer 200 can be provided with user pseudonym 804, identification of accessed content 806, and/or content consumption time 808. This information can be stored at online content management system 102 in association with link sharer's account 900.

Process Overview

Figure 10:
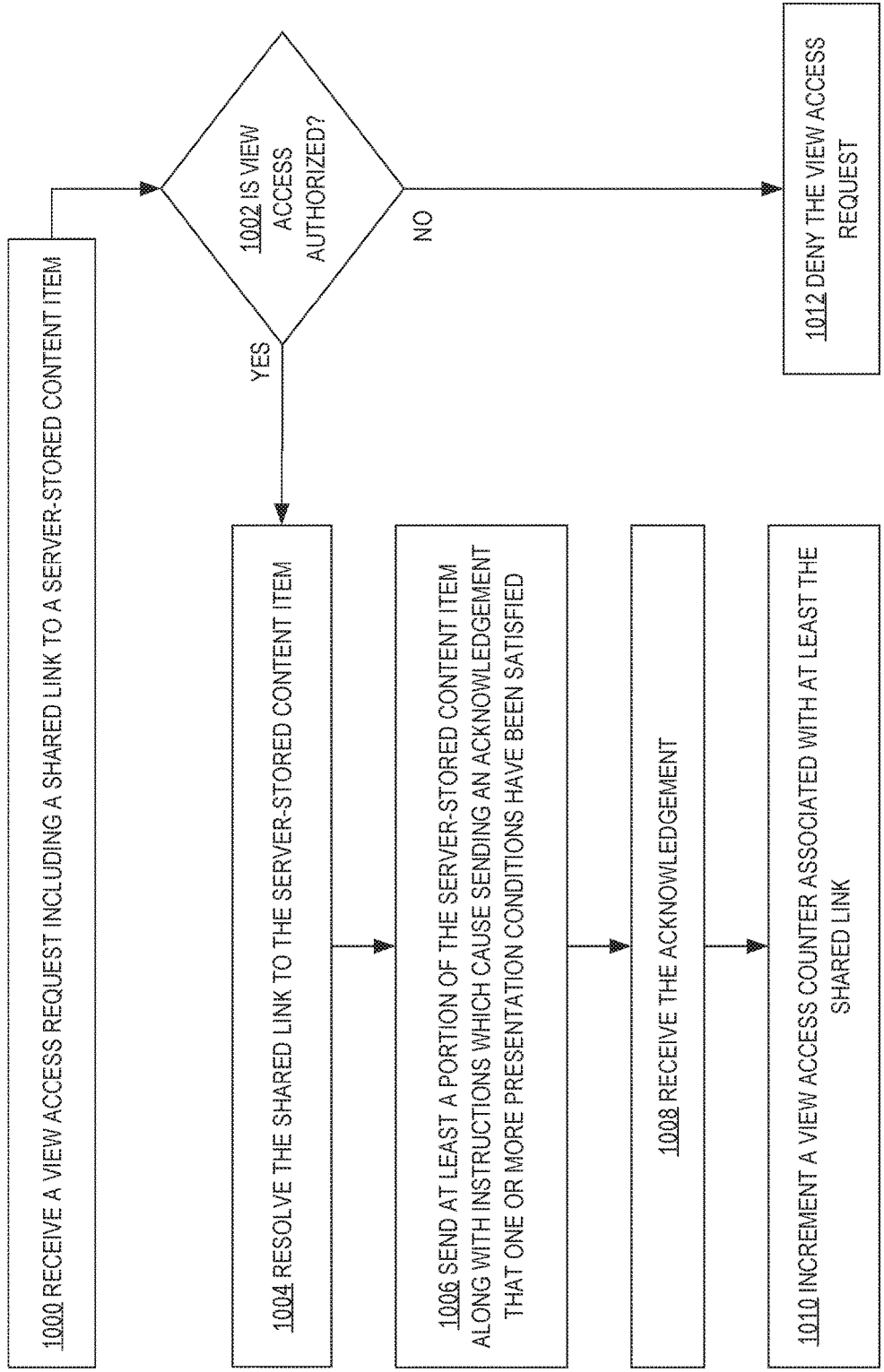
FIG. 10 is a flow diagram that depicts an approach for managing access to shared content.

FIG. 10 is a flow diagram that depicts an approach for managing access, including view access, to shared content. At block 1000, online content management system 102 receives a view access request 502 from a client device 100N. The view access request 502 can include a shared link

500 to a server-stored content item 400. Prior to block 1000, client device 100N received the shared link 500 from online content management system 102, which created the shared link 500 and associated it with a view access counter 404.

At block 1002, online content management system 102 determines whether the view access request 502 is authorized. This determination can be based on identifying the view access counter 404 that is associated with at least the shared link 500 and comparing the view access counter 404 to a maximum number of authorized view accesses 606. If the view access request 502 is authorized, block 1002 proceeds to block 1004. Otherwise, block 1002 proceeds to block 1012.

At block 1004, online content management system 102 resolves the shared link 500 to the server-stored content item 400. Block 1004 can be performed prior to, concurrently with, or subsequent to block 1002.

At block 1006, online content management system 102 sends at least a portion 700 of the server-stored content item 400 to the client device 100N. At least the portion 700 can be displayed at the client device 100N based on one or more client-side scripts. The one or more client-side scripts can discourage and/or prevent unauthorized duplication of the server-stored content item 400. For example, the one or more client-side scripts can disable printing, cause cached data to expire quickly, and/or cause consumption of the server-stored content item 400 to be interrupted when selection of a screenshot key is detected. Interrupting consumption of the server-stored content item 400 can include content redaction, minimizing a view window, closing the view window, superimposing another view window on the view window, and/or any other techniques for obscuring display of the server-stored content item 400.

Online content management system 102 also sends instructions 702 to the client device 100N. The instructions 702 cause the client device 100N to send an acknowledgement 704 that one or more presentation conditions have been satisfied. The one or more presentation conditions can include presenting at least the portion 700 to a recipient, presenting at least the portion 700 for a predetermined length of time, and/or receiving an indication that the recipient interacted with at least the portion 700.

At block 1008, online content management system 102 receives the acknowledgement 704. The acknowledgement 704 can identify the recipient who accessed/view accessed at least the portion 700, identify one or more portions of the server-stored content item 400 that were presented, and/or indicate a length of time during which the recipient consumed at least the portion 700.

At block 1010, online content management system 102 increments the view access counter 404 that is associated with at least the shared link 500. If the view access counter 404 is incremented to a value that is greater than or equal to the maximum number of authorized view accesses 606, the shared link 500 can be said to have expired. In other words, further view access requests related to the shared link 500 will be determined to be unauthorized.

At block 1012, online content management system 102 denies any view access requests that are determined to be unauthorized. For example, online content management system 102 can cause the client device 100N to display a message indicating that the shared link 500 has expired.

Basic Computing Device

Figure 11:
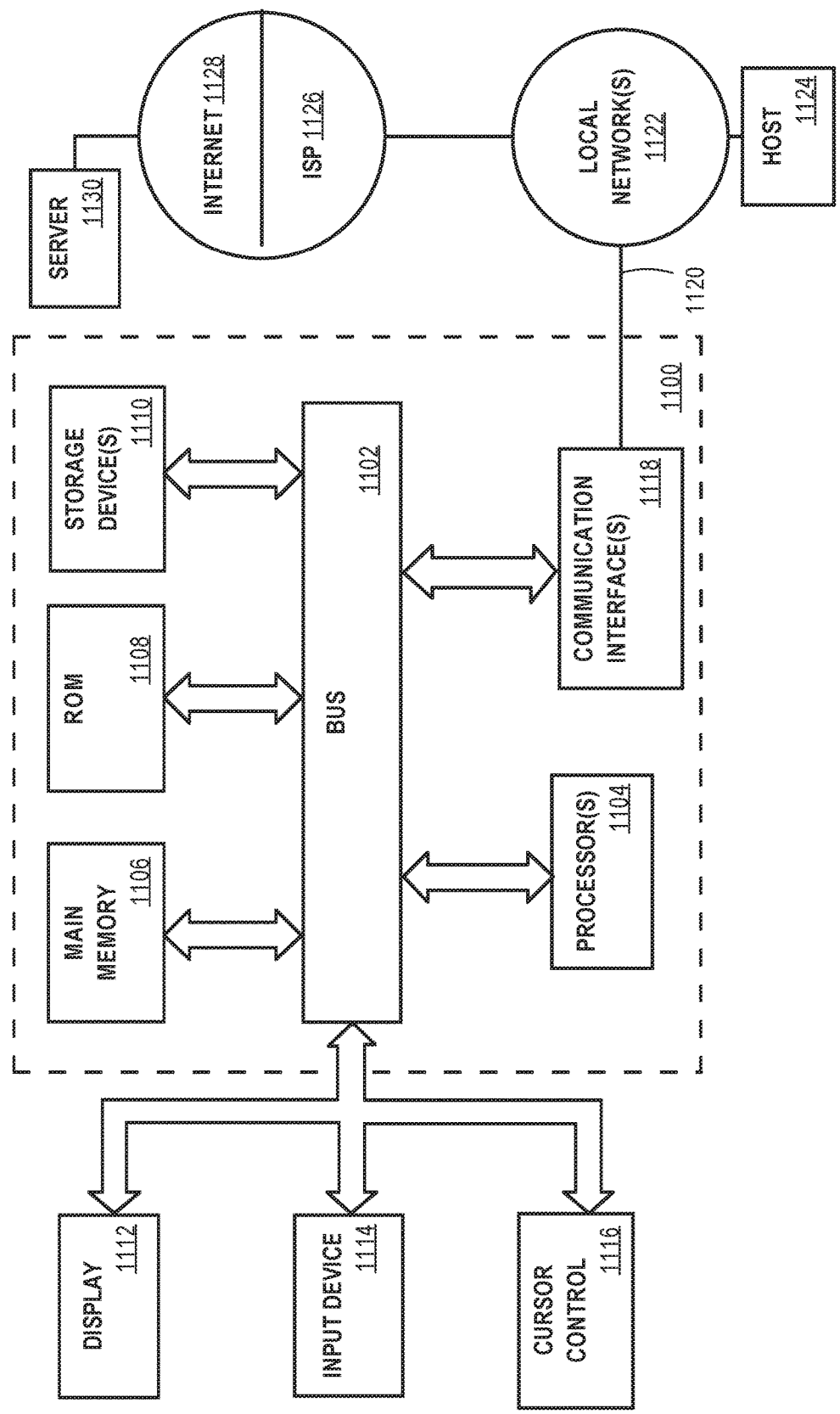
FIG. 11 is a very general block diagram of a computing device in which the example embodiment(s) of the present Application may be embodied.

Referring now to FIG. 11, it is a block diagram that illustrates a basic computing device 1100 in which the example embodiment(s) of the present Application may be embodied. Computing device 1100 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1100 may include a bus 1102 or other communication mechanism for addressing main memory 1106 and for transferring data between and among the various components of device 1100.

Computing device 1100 may also include one or more hardware processors 1104 coupled with bus 1102 for processing information. A hardware processor 1104 may be a general purpose microprocessor, a system on a chip (SoC), or other processor.

Main memory 1106, such as a random access memory (RAM) or other dynamic storage device, also may be coupled to bus 1102 for storing information and software instructions to be executed by processor(s) 1104. Main memory 1106 also may be used for storing temporary variables or other intermediate information during execution of software instructions to be executed by processor(s) 1104.

Software instructions, when stored in storage media accessible to processor(s) 1104, render computing device 1100 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1100 also may include read only memory (ROM) 1108 or other static storage device coupled to bus 1102 for storing static information and software instructions for processor(s) 1104.

One or more mass storage devices 1110 may be coupled to bus 1102 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1110 (e.g., the main hard disk for the device) stores a body of program and data for directing operation of the computing device, including an operating system, user application programs, driver and other support files, as well as other data files of all sorts.

Computing device 1100 may be coupled via bus 1102 to display 1112, such as a liquid crystal display (LCD) or other electronic visual display, for displaying information to a computer user. In some configurations, a touch sensitive surface incorporating touch detection technology (e.g., resistive, capacitive, etc.) may be overlaid on display 1112 to form a touch sensitive display for communicating touch gesture (e.g., finger or stylus) input to processor(s) 1104.

An input device 1114, including alphanumeric and other keys, may be coupled to bus 1102 for communicating information and command selections to processor 1104. In addition to or instead of alphanumeric and other keys, input device 1114 may include one or more physical buttons or switches such as, for example, a power (on/off) button, a "home" button, volume control buttons, or the like.

Another type of user input device may be a cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

While in some configurations, such as the configuration depicted in FIG. 11, one or more of display 1112, input device 1114, and cursor control 1116 are external components (i.e., peripheral devices) of computing device 1100, some or all of display 1112, input device 1114, and cursor control 1116 are integrated as part of the form factor of computing device 1100 in other configurations.

Functions of the disclosed systems, methods, and modules may be performed by computing device 1100 in response to processor(s) 1104 executing one or more programs of software instructions contained in main memory 1106. Such software instructions may be read into main memory 1106 from another storage medium, such as storage device(s) 1110. Execution of the software instructions contained in main memory 1106 cause processor(s) 1104 to perform the functions of the example embodiment(s).

While functions and operations of the example embodiment(s) may be implemented entirely with software instructions, hard-wired or programmable circuitry of computing device 1100 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more software instructions to processor(s) 1104 for execution. For example, the software instructions may initially be carried on a magnetic disk or solid-state drive of a remote computer. The remote computer can load the software instructions into its dynamic memory and send the software instructions over a telephone line using a modem. A modem local to computing device 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor(s) 1104 retrieves and executes the software instructions. The software instructions received by main memory 1106 may optionally be stored on storage device(s) 1110 either before or after execution by processor(s) 1104.

Computing device 1100 also may include one or more communication interface(s) 1118 coupled to bus 1102. A communication interface 1118 provides a two-way data communication coupling to a wired or wireless network link 1120 that is connected to a local network 1122 (e.g., Ethernet network, Wireless Local Area Network, cellular phone network, Bluetooth wireless network, or the like). Communication interface 1118 sends and receives electrical, electromagnetic, or optical signals that carry digital data streams representing various types of information. For example, communication interface 1118 may be a wired network interface card, a wireless network interface card with an integrated radio antenna, or a modem (e.g., ISDN, DSL, or cable modem).

Network link(s) 1120 typically provide data communication through one or more networks to other data devices. For example, a network link 1120 may provide a connection through a local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network(s) 1122 and Internet 1128 use electrical, electromagnetic or optical signals that carry digital data streams. The signals through the various networks and the signals on network link(s) 1120 and through communication interface(s) 1118, which carry the digital data to and from computing device 1100, are example forms of transmission media.

Computing device 1100 can send messages and receive data, including program code, through the network(s), network link(s) 1120 and communication interface(s) 1118. In the Internet example, a server 1130 might transmit a requested code for an application program through Internet 1128, ISP 1126, local network(s) 1122 and communication interface(s) 1118.

The received code may be executed by processor 1104 as it is received, and/or stored in storage device 1110, or other non-volatile storage for later execution.

Basic Software System

Figure 12:
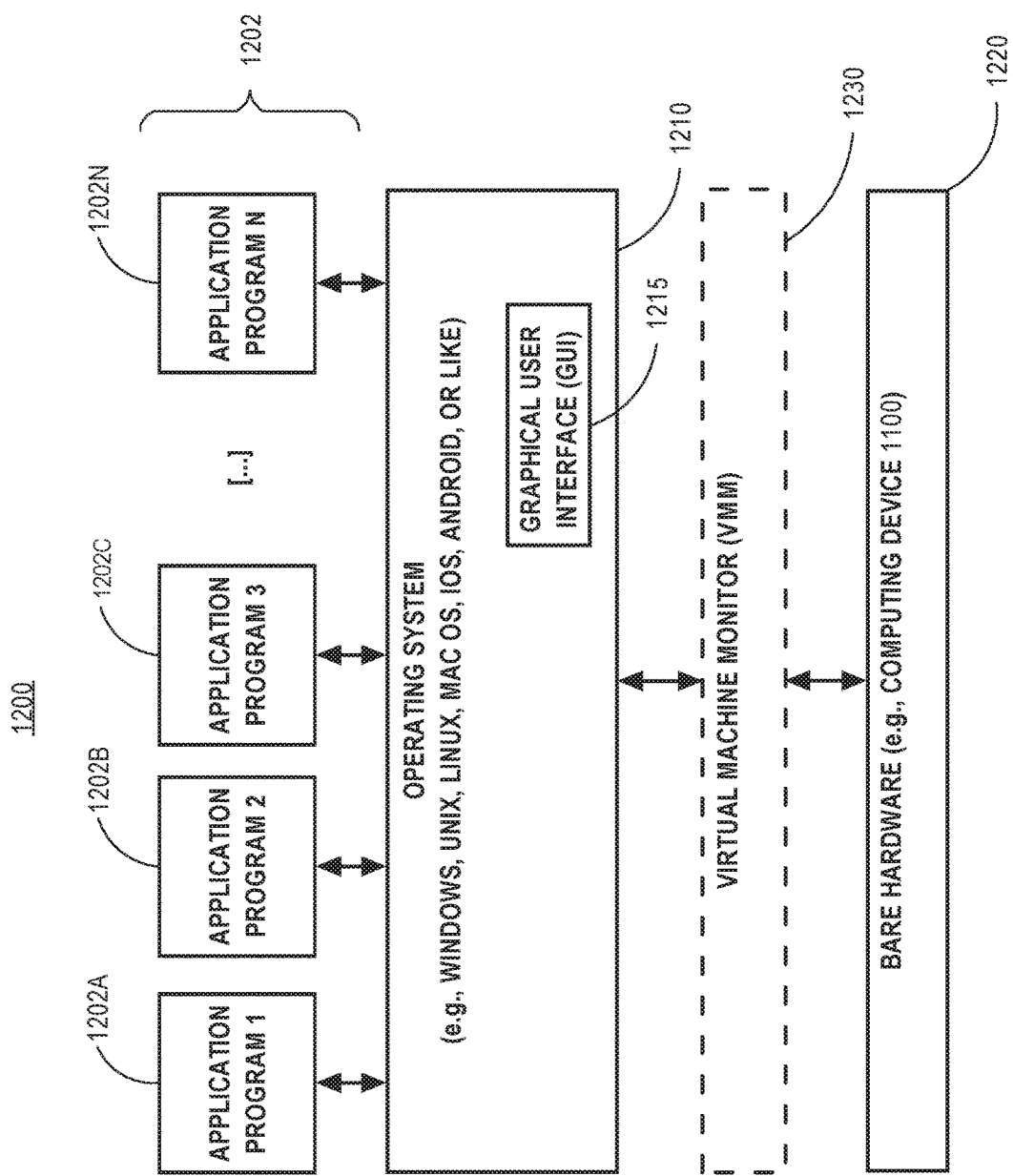
FIG. 12 is a block diagram of a basic software system for controlling the operation of the computing device.

FIG. 12 is a block diagram of a basic software system 1200 that may be employed for controlling the operation of computing device 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing device 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on device 1200 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of device 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the device 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of device 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present Application have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at one or more computing devices comprising one or more processors and memory storing one or more computer programs executed by the one or more processors to perform the method, performing operations comprising:
receiving a view access request from a client device that is to be authorized to access a server-stored content item at an online content management system, the view access request comprising a shared link to the server-stored content item;
determining the view access request is authorized based, at least in part, on a view access counter associated with at least the shared link;
resolving the shared link to the server-stored content item;
sending, to the client device, at least a portion of the server-stored content item along with instructions which, when executed at the client device, cause sending an acknowledgement to a server based on verifying one or more presentation conditions with respect to the server-stored content item have been satisfied at the client device;
wherein at least one presentation condition of the one or more presentation conditions is that at least the portion of the server-stored content item be presented in a foreground user interface at the client device for at least a predetermined amount of time;
wherein the instructions are configured to verify that at least the portion of the server-stored content item is presented in the foreground user interface at the client device for at least the predetermined amount of time and send the acknowledgement to the server only if the one or more presentation conditions are satisfied;
receiving the acknowledgement from the client device;
in response to receiving the acknowledgement, incrementing the view access counter associated with at least the shared link.

2. The method of claim 1, wherein prior to receiving a view access request from a client device that is to be authorized to access a server-stored content item at an online content management system, the operations further comprise:
receiving, from a different client device that is authorized to access a link sharer's account at the online content management system, a request to at least create the shared link to the server-stored content item;
in response to receiving the request, creating the shared link and an association between the shared link and the view access counter.

3. The method of claim 2, wherein after creating the shared link and an association between the shared link and the view access counter, the operations further comprise:
sending the shared link to the client device that is to be authorized to access the server-stored content item at the online content management system.

4. The method of claim 2, wherein after creating the shared link and an association between the shared link and the view access counter, the operations further comprise:

sending the shared link to the different client device that is authorized to access the link sharer's account at the online content management system.

5. The method of claim 2, wherein after receiving the acknowledgement from the client device, associating, with the link sharer's account, a notification that at least the portion of the server-stored content item has been presented to a particular user.

6. The method of claim 1, wherein determining the view access request is authorized based, at least in part, on a view access counter associated with at least the shared link includes:

identifying the view access counter associated with at least the shared link based on a mapping between links and view access counters;

comparing the view access counter to a maximum number of authorized view accesses.

7. The method of claim 1, wherein the one or more presentation conditions include:

receiving, in the foreground user interface at the client device, an indication that at least the portion of the server-stored content item has been navigated.

8. The method of claim 1, wherein the acknowledgement identifies a particular portion of the server-stored content item that is view accessed.

9. The method of claim 1, wherein the acknowledgement indicates that at least the portion of the server-stored content item has been presented in the foreground user interface at the client device for a particular amount of time that is at least as long as the predetermined amount of time.

10. The method of claim 1, wherein the view access counter is specific to the shared link and independent of the server-stored content item to which the shared link refers.

11. A system, comprising:

storage media;

one or more processors;

and one or more programs stored in the storage media and configured for execution by the one or more processors, the one or more programs comprising a sequence of instructions for performing operations comprising:

receiving a view access request from a client device that is to be authorized to access a server-stored content item at an online content management system, the view access request comprising a shared link to the server-stored content item;

determining the view access request is authorized based, at least in part, on a view access counter associated with at least the shared link;

resolving the shared link to the server-stored content item;

sending, to the client device, at least a portion of the server-stored content item along with instructions which, when executed at the client device, cause sending an acknowledgement to a server based on verifying one or more presentation conditions with respect to the server-stored content item have been satisfied at the client device;

wherein at least one presentation condition of the one or more presentation conditions is that at least the portion of the server-stored content item be presented in a foreground user interface at the client device for at least a predetermined amount of time;

wherein the instructions are configured to verify that at least the portion of the server-stored content item is presented in the foreground user interface at the client device for at least the predetermined amount of time and send the acknowledgement to the server only if the one or more presentation conditions are satisfied;

receiving the acknowledgement from the client device;

in response to receiving the acknowledgement, incrementing the view access counter associated with at least the shared link.

12. The system of claim 11, wherein prior to receiving a view access request from a client device that is to be authorized to access a server-stored content item at an online content management system, the operations further comprise:

receiving, from a different client device that is authorized to access a link sharer's account at the online content management system, a request to at least create the shared link to the server-stored content item;

in response to receiving the request, creating the shared link and an association between the shared link and the view access counter.

13. The system of claim 12, wherein after creating the shared link and an association between the shared link and the view access counter, the operations further comprise:

sending the shared link to the client device that is to be authorized to access the server-stored content item at the online content management system.

14. The system of claim 12, wherein after creating the shared link and an association between the shared link and the view access counter, the operations further comprise:

sending the shared link to the different client device that is authorized to access the link sharer's account at the online content management system.

15. The system of claim 12, wherein after receiving the acknowledgement from the client device, associating, with the link sharer's account, a notification that at least the portion of the server-stored content item has been presented to a particular user.

16. The system of claim 11, wherein determining the view access request is authorized based, at least in part, on a view access counter associated with at least the shared link includes:

identifying the view access counter associated with at least the shared link based on a mapping between links and view access counters;

comparing the view access counter to a maximum number of authorized view accesses.

17. The system of claim 11, wherein the one or more presentation conditions include:

receiving, in the foreground user interface at the client device, an indication that at least the portion of the server-stored content item has been navigated.

18. The system of claim 11, wherein the acknowledgement identifies a particular portion of the server-stored content item that is view accessed.

19. The system of claim 11, wherein the acknowledgement indicates that at least the portion of the server-stored content item has been presented in the foreground user interface at the client device for a particular amount of time that is at least as long as the predetermined amount of time.

20. The system of claim 11, wherein the view access counter is specific to the shared link and independent of the server-stored content item to which the shared link refers.

* * * * *